March 29, 1932. W. KRAUSE 1,851,284
UNDERCUTTER ATTACHMENT FOR FLEXIBLE SHAFT BENCH GRINDERS
Filed July 12, 1930
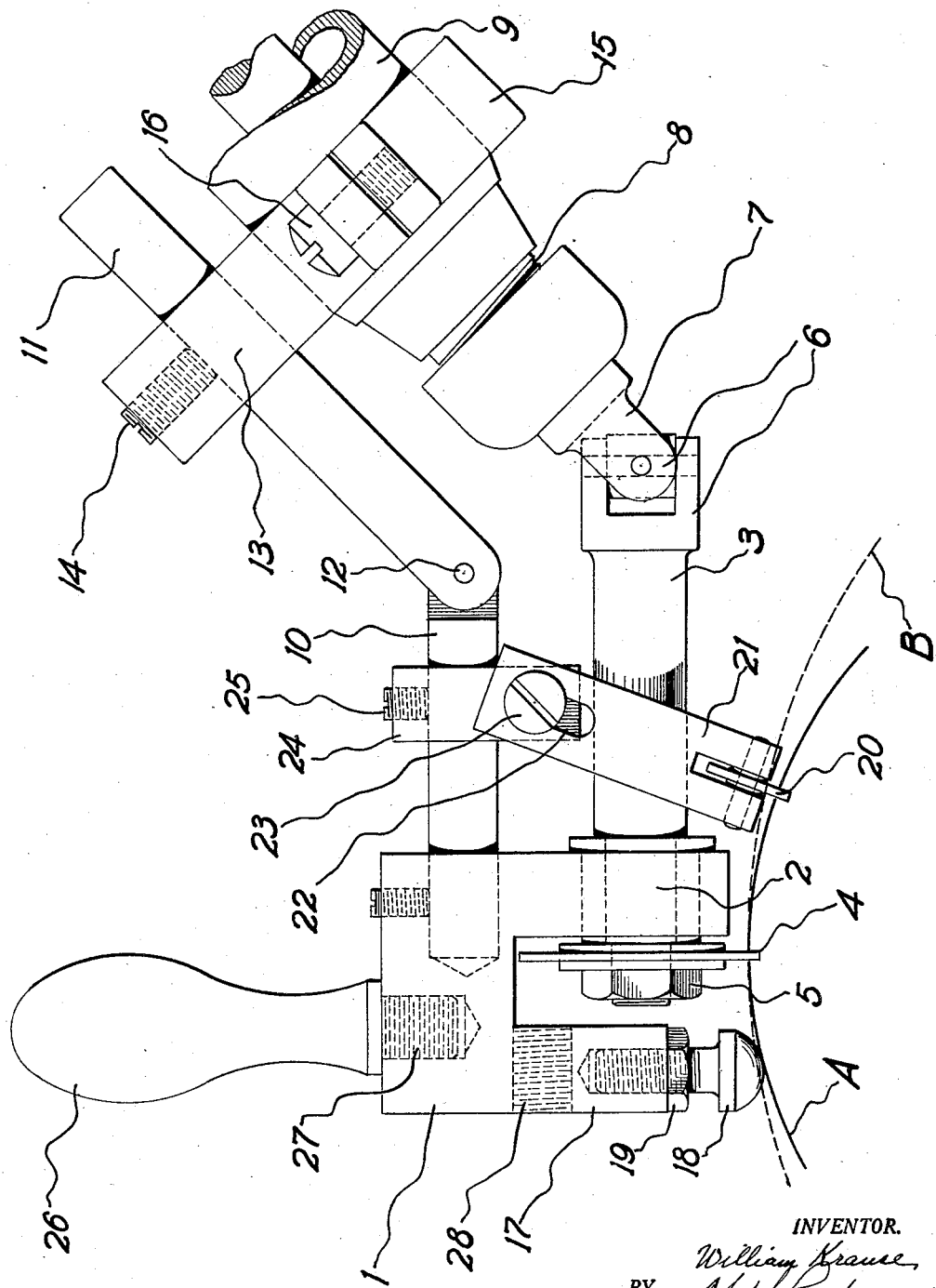
INVENTOR.
William Krause,
BY
ATTORNEYS.

Patented Mar. 29, 1932

1,851,284

UNITED STATES PATENT OFFICE

WILLIAM KRAUSE, OF BRONX, NEW YORK, ASSIGNOR, BY MESNE ASSIGNMENTS, TO PRATT & WHITNEY COMPANY, OF HARTFORD, CONNECTICUT, A CORPORATION OF NEW JERSEY

UNDERCUTTER ATTACHMENT FOR FLEXIBLE SHAFT BENCH GRINDERS

Application filed July 12, 1930. Serial No. 467,405.

This improvement relates to an attachment adapted to be used in the hand piece of a flexible shaft bench grinder for the purpose of cutting grooves in commutators and the like after they have been turned to the desired diameter.

One object of the present improvement is to provide a universal joint connection between the arbor or shaft of the cutter and the hand piece and to provide means for supporting or partially supporting the attachment on the hand piece.

It will be understood that the attachment may be used on commutators or cylindrical surfaces of different diameters and accordingly, a further object is to provide means for adjusting the device for operation upon commutators or surfaces of different diameters.

One form of the improvement is shown in the accompanying drawing, which shows the attachment in connection with a flexible shaft hand piece which is shown partially broken away.

Referring to the drawing, it will be seen that the undercutter attachment comprises a frame or body member 1, provided with a bearing at 2, wherein the cutter shaft or arbor 3 is supported. A cutter 4 of any preferred form, such as a slotting cutter, is shown on the end of the arbor or shaft 3 and secured thereto by a nut 5. Connected to the end of the arbor or shaft 3 by means of a universal joint 6, is a connector formed as a stud 7, which is shown as securely clamped in the chuck 8 of the hand piece 9, which is adapted to be carried on the end of a flexible shaft and driven from the motor of the flexible shaft bench grinder. Substantially this form of flexible shaft machine is shown in the patent to A. B. Bachmann, No. 1,575,307, of March 2, 1926.

In order to provide for angularly supporting the attachment on the hand piece, the frame or body member 1 is provided with a laterally extending rod or bracket 10, upon which a hinged arm or rod 11 is supported, the latter being pivoted at 12, as shown in the drawing. The arm or rod 11 is provided with a slidable clamp member 13, adapted to be adjustably secured to the rod 11 by a set screw at 14. This clamp member 13 is provided with a yoke 15 which is shown as clamping the hand piece 9 to the bracket 13, by means of screws 16. The frame or body member 1 is provided with a leg 17 opposite the cutter arbor bearing 2, in which a threaded bolt 18 is mounted, the latter being provided with a rounded head to serve as a depth gauge. When the depth gauge is adjusted properly, it may be clamped in adjusted position by a nut 19.

In order to readily move the attachment longitudinally of the commutator surface, a guide roller 20 is mounted in the lower end of a bar 21, provided at its upper end with a slot 22, cooperating with a screw 23, for permitting adjustment of the position of the guide roller 20 radially of the commutator and angularly with reference to its support or angularly as to the surface or a radius of the commutator. The adjusting screw 23 is adapted to clamp the guide roller supporting bar 21 to a slide bracket 24 adapted to be adjustably secured on the rod 10 by a suitable set screw at 25. By means of the adjustment of the slide bracket 24 along the rod 10, it will be seen that the position of the guide roller 20 can be varied along or parallel to the cutter arbor or shaft 3.

In order to provide convenient means for holding the attachment while guiding it across the commutator, a suitable handle 26 is provided, the handle being inserted as shown in the drawing, in a screw threaded hole 27 on the upper side of the frame member 1, but if desired, the handle may be inserted horizontally in a screw-threaded hole at 28 at the side of the frame member 1.

The undercutter attachment may be used for cutting slots in commutators of different diameters and, as shown in the drawing, the guide roller and depth gauge are indicated as in contact with a commutator of the diameter indicated at A, but by adjusting the support of the guide roller 20, the device may be adapted for any other diameter of commutator, a commutator of larger diameter being indicated at B.

It will be understood that the operation of the attachment is relatively simple in that the adjustments are readily made, according to the diameter of the commutator to be operated upon, the depth gauge 18 being adjusted according to the depth of cut required. The guide roller 20 is then adjusted angularly to bring its surface tangent to the commutator, and longitudinally or radially by means of the slot and screw connection 22—23 and if necessary, the bracket support 24 may be adjusted inward or outward along the rod 10 according to the diameter of the commutator.

The angular position of the hand piece 9 may be varied by sliding the clamp member 13 longitudinally of the hinged rod 11, the clamp member 13 being secured to the rod 11 by the set screw 14, as previously indicated.

While one form of the improvement has been shown, it will be understood that various modifications and changes may be made in the specific details of construction without departing from the spirit and scope of the invention.

I claim:—

1. An undercutter attachment for flexible shaft bench grinders comprising a frame member, a cutter arbor rotatably supported in said frame member, means including a guide roller for positioning the cutter relative to the work, and means for adjusting said guide roller transversely and angularly of said arbor.

2. An undercutter attachment for flexible shaft bench grinders, comprising a frame member, a cutter arbor rotatably supported thereby, a depth gauge for controlling the depth of the cut, a guide roller adapted for rolling contact with the work and means for adjusting said guide roller angularly and longitudinally relative to a radius of the work.

3. The undercutter attachment for flexible shaft bench grinders, as in claim 2, wherein means mounted on the frame member is adapted for clamping and supporting the flexible shaft hand piece angularly of said frame member and a connector adapted to be secured in said hand piece is connected by a universal joint with the end of said arbor.

WILLIAM KRAUSE.